No. 760,812. PATENTED MAY 24, 1904.
W. H. SMITH.
BOLT AND NUT LOCK.
APPLICATION FILED JAN. 26, 1903.
NO MODEL.
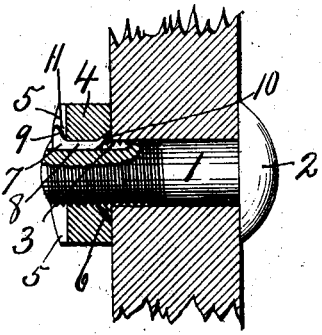
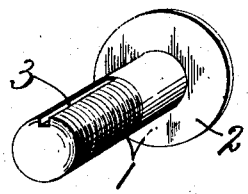
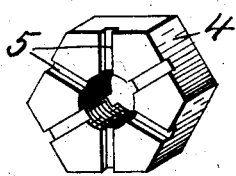
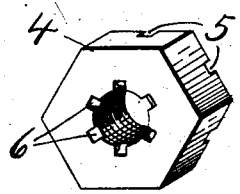
WITNESSES:
INVENTOR
William H. Smith
BY
Howard P. Denison
ATTORNEYS.

No. 760,812. Patented May 24, 1904.

UNITED STATES PATENT OFFICE.

WILLIAM H. SMITH, OF SYRACUSE, NEW YORK.

BOLT AND NUT LOCK.

SPECIFICATION forming part of Letters Patent No. 760,812, dated May 24, 1904.

Application filed January 26, 1903. Serial No. 140,558. (No model.)

*To all whom it may concern:*

Be it known that I, WILLIAM H. SMITH, of Syracuse, in the county of Onondaga, in the State of New York, have invented new and useful Improvements in Bolt and Nut Locks, of which the following, taken in connection with the accompanying drawings, is a full, clear, and exact description.

This invention relates to improvements in nut-locks in which a key is movable endwise in a suitable seat provided in a bolt and engaged under a spring tension with the nut.

The object of this improvement is to provide a key with a yielding engaging end which is adapted to be driven into the seat, so that when it is in operative position the yielding end will automatically spring into a groove provided in the inner end face of the nut.

Referring to the drawings, Figure 1 is an elevation, partly in section, of a bolt and nut, showing the key in its operative position. Fig. 2 is a perspective view of the detached bolt, showing particularly the seat for the key. Figs. 3 and 4 are opposite face views in perspective of the nut, showing the grooves or recesses which receive the opposite ends of the key. Fig. 5 is a perspective view of the detached key.

Similar reference characters indicate corresponding parts in all the views.

In carrying out the objects of this invention a bolt 1 is provided with a head 2 at one end and with a lengthwise slot or key-seat 3 extending inwardly from its opposite end, this latter end being threaded to receive a nut 4. The outer end face of this nut is provided with one or more radial grooves or recesses 5 of substantially uniform depth, which extend from the threaded aperture to the perimeter thereof, and the opposite face is also provided with one or more recesses 6, which are preferably radial and extend outwardly from the threaded aperture, the outer walls of these latter recesses being beveled or inclined.

A key 7 is inserted in the key-seat 3, and the central portion or main body 8 of the key is substantially the same depth as the key-seat, and its outer end is provided with an inclined shoulder 9, which enters a groove 5 of the nut, which may be alined with the seat. The opposite or inner end of the key 7 is preferably thinner than the main body for forming a yielding spring-shoulder 10, which normally inclines outwardly from the main body 8 and operatively enters the recesses 6 to hold the key from displacement and also to additionally hold the nut and bolt from rotation relatively to each other. These keys are usually formed of substantially the same length as the thickness of the nut and are usually driven in place, the shoulder 9 serving to limit its inward movement and also further preventing the rotation of the bolt and nut relatively to each other. During the operation of placing the key in position the spring end 10 is first inserted in the key-seat, and then the key is driven inwardly, the spring end 10 serving to straighten out until it reaches its recess 6, whereupon said yielding end 10 automatically springs outwardly into its recess. It will be noted that when the key is thus inserted an angular space 11 is left between the inner wall of the recess 5 and adjacent beveled face 9, the object of this being to permit the insertion of a suitable tool whereby the key may be withdrawn, if desired.

The operation of my invention will now be readily understood upon reference to the foregoing description and the accompanying drawings.

Having thus described my invention, what I claim, and desire to secure by Letters Patent, is—

In a bolt and nut lock, a bolt having a lengthwise key-seat, a nut mounted on the bolt and provided with recesses in its opposite faces alined with the seat, a key inserted in the seat and having a yielding inner end tensioned to spring outwardly into the inner recess of the nut and its outer end provided with a beveled face projecting into the outer recess of the nut and forming an angular space with the inner wall of said outer recess.

In witness whereof I have hereunto set my hand this 13th day of December, 1902.

WILLIAM H. SMITH.

Witnesses:
H. E. CHASE,
MILDRED M. NOTT.